United States Patent
Calvarese

(10) Patent No.: US 7,825,806 B2
(45) Date of Patent: Nov. 2, 2010

(54) OPTIMIZING RFID READER DUTY CYCLE OR POWER TO PRESERVE BATTERY LIFE

(75) Inventor: Russell Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 305 days.

(21) Appl. No.: 11/860,958

(22) Filed: Sep. 25, 2007

(65) Prior Publication Data

US 2009/0079571 A1 Mar. 26, 2009

(51) Int. Cl.
*G08B 13/14* (2006.01)
(52) U.S. Cl. ................... 340/572.1; 340/572.4
(58) Field of Classification Search .............. 340/572.1, 340/572.3, 572.4, 551, 10.33, 10.34
See application file for complete search history.

(56) References Cited

U.S. PATENT DOCUMENTS

| 6,111,507 | A * | 8/2000 | Alicot et al. | 340/572.1 |
| 6,150,948 | A * | 11/2000 | Watkins | 340/693.3 |
| 6,476,708 | B1 * | 11/2002 | Johnson | 340/572.4 |
| 6,696,951 | B2 * | 2/2004 | Belka et al. | 340/572.1 |
| 6,734,797 | B2 | 5/2004 | Shanks et al. | |
| 7,546,477 | B2 * | 6/2009 | Breen et al. | 340/572.1 |
| 7,587,190 | B2 * | 9/2009 | Balachandran et al. | 340/572.1 |
| 2005/0083181 | A1 * | 4/2005 | Jalkanen et al. | 340/10.34 |

FOREIGN PATENT DOCUMENTS

| EP | 0944014 A2 | 9/1999 |
| EP | 0944015 A2 | 9/1999 |
| WO | 2005038696 | 4/2005 |
| WO | WO2009/042430 | 4/2009 |

OTHER PUBLICATIONS

International Search Report and Written Opinion dated May 21, 2010 in related case PCT/US2008/076364.

* cited by examiner

*Primary Examiner*—John A Tweel, Jr.

(57) ABSTRACT

The duty cycle of a portable battery-powered RFID tag reader is reduced during time periods when it is less likely to produce a "read" in order to preserve battery life. The reader operates with an aggressive duty cycle during periods of a high probability of a tag read and reduces duty cycle during periods of a low probability of a tag read. In this manner a user does not perceive the reader to be sluggish. An alternative embodiment reduces peak operating power during time periods when a tag is less likely to produce a "read" in order to preserve battery life.

9 Claims, 9 Drawing Sheets

OPTIMIZING RFID READER DUTY CYCLE OR POWER TO PRESERVE BATTERY LIFE

BACKGROUND

The inventions relate in general to the use of radio frequency identification (RFID) tags and RFID tag readers (also known as "interrogators"). In particular, the inventions relate to the configuration and operation of battery-powered RFID tag readers.

Portable RFID tag readers typically draw high current to provide output power required to read RFID tags at a distance. In battery powered devices, high current quickly depletes the system battery. Duty cycles are typically implemented such that the average current is within acceptable limit. As the duty cycle is reduced, there becomes a point at which reader aggressiveness is significantly reduced. Reader aggressiveness relates to how quickly and easily the reader can read a tag from the user's perspective. Aggressive readers do not appear to the user to be sluggish or incapable of reliable operation at the intended read distance.

Radio frequency identification (RFID) tags are electronic devices that may be affixed to items whose presence is to be detected and/or monitored. RFID tags are classified based on standards defined by national and international standards bodies (e.g., EPCGlobal and ISO). Standard tag classes include Class 0, Class 1, and Class 1 Generation 2 (referred to herein as "Gen 2"). The presence of an RFID tag, and therefore the presence of the item to which the tag is affixed, may be checked and monitored wirelessly by an "RFID reader", also known as a "reader-interrogator", "interrogator", or simply "reader." Readers typically have one or more antennas for transmitting radio frequency signals to RFID tags and receiving responses from them. An RFID tag within range of a reader-transmitted signal responds with a signal including a unique identifier.

With the maturation of RFID technology, efficient communication between tags and readers has become a key enabler in supply chain management, especially in manufacturing, shipping, and retail industries, as well as in building security installations, healthcare facilities, libraries, airports, warehouses etc. However, current RFID tag reader designs result in battery life that is too short for many portable readers. A better arrangement is needed for managing power consumption of a portable reader so that it has longer battery life while still appearing responsive to the user.

SUMMARY

This summary is for the purpose of summarizing some aspects of the inventions described more fully in other sections of this patent document. It briefly introduces some preferred embodiments. Simplifications or omissions may be made to avoid obscuring the purpose of the section. Such simplifications or omissions are not intended to limit the scope of the claimed inventions. The inventions can be implemented in numerous ways, including methods, systems, devices, and computer readable medium. Several embodiments of the inventions are discussed below, but they are not the only ways to practice the inventions described herein.

The inventions provide a method of operation that optimizes power consumption of an RFID tag reader. Utilizing the methods presented herein, a reader optimizes its power consumption such that it uses more average power during times when it is more likely that a successful read will occur and utilizes less average power during periods when a successful read is less likely to occur. An algorithm is presented that changes the duty cycle in accordance with predetermined criteria. While presently preferred embodiments of this invention concentrate on changing the duty cycle as the means to optimize reader aggressiveness verses power consumption, changing the peak power can also be used. (again based on the times when it is more likely that a successful read will occur) Changing the power greatly affects the range of the reader but it can still be used to exploit the probability concepts presented.

Any scheme to reduce the average power of an RFID system has the added benefit of allowing more readers to operate in a given area. (RF spectrum friendly)

In another embodiment, the reader learns when the probability of a tag being in range is high and adjusts the duty cycle accordingly.

For example, the reader can learn user habits such as a user habitually triggering the reader then pointing the reader at the tag a second or two later. In a further example, the reader can learn how long to wait after failing multiple read attempts due to interference from other RFID readers. Anyone skilled in the art could expand this to provide a cooperation scheme between nearby readers. Such a scheme could use duty cycle adjustments and/or a random hold off time to reduce wasted RF transmissions.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Exemplary Operating Environment

Figure 1:
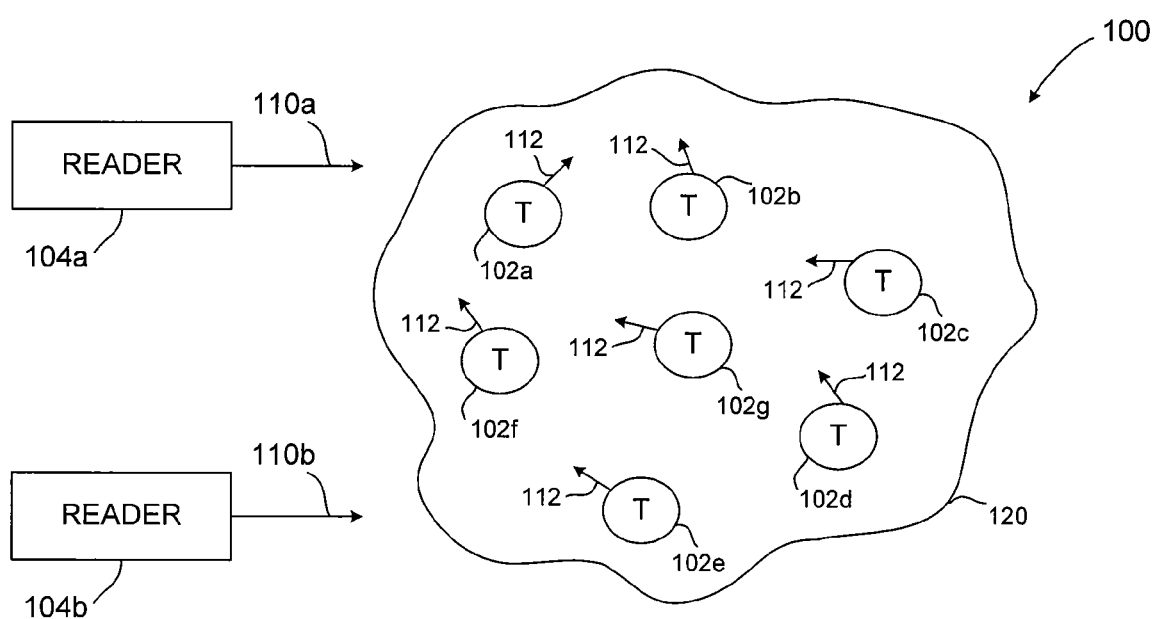
FIG. 1 illustrates an environment in which RFID tag readers communicate with a population of RFID tags.

Before describing embodiments of the inventions in detail, it may be helpful to understand an example RFID communications environment in which the inventions may be implemented. FIG. 1 illustrates an environment 100 where RFID tag readers 104 (readers 104*a* and 104*b* shown in FIG. 1) communicate with an exemplary population 120 of RFID tags 102. As shown in FIG. 1, the population 120 of tags includes seven tags 102*a*-102*g*. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network (see FIG. 2). A reader 104 may be continuously commercial powered by attachment to power mains or it may be battery powered. The inventions described herein are particularly applicable to battery powered readers.

As shown in FIG. 1, reader 104a "reads" tags 120 by transmitting an interrogation signal 110a to the population of tags 120. Interrogation signals may have a primary signal at a particular carrier frequency or may comprise a plurality of signals transmitted in a frequency hopping arrangement or some other configuration. Readers 104a and 104b typically operate in one or more of the frequency bands allotted for this type of RF communication. For example, the Federal Communication Commission (FCC) defined frequency bands of 902-928 MHz and 2400-2483.5 MHz for certain RFID applications.

Tag population 120 may include tags 102 of various types, such as, for example, various classes of tags as enumerated above. Thus, in response to interrogation signals, the various tags 102 may transmit one or more response signals 112 to an interrogating reader 104. Tags of one type, for example, respond by alternatively reflecting and absorbing portions of signal 104 according to a time-based pattern. This technique for alternatively absorbing and reflecting signal 104 is referred to as "backscatter modulation." Backscatter modulation may include one or more alpha-numeric characters that uniquely identify a particular tag (and therefore an object to which the tag may be affixed). Readers 104a and 104b receive data from response signals 112, such as an identification number of the responding tag 102. In embodiments described herein, a reader may be capable of communicating with tags 102 according to various suitable communication protocols, including Class 0, Class 1, EPC Gen 2, other binary traversal protocols and slotted aloha protocols, and any other protocols mentioned elsewhere herein. They may be adapted to support communication protocols to be created in the future. Tag population 120 may include one or more tags having a packed object format described herein and/or one or more tags not using the packed object format, such as, for example, standard ISO tags.

Figure 2:
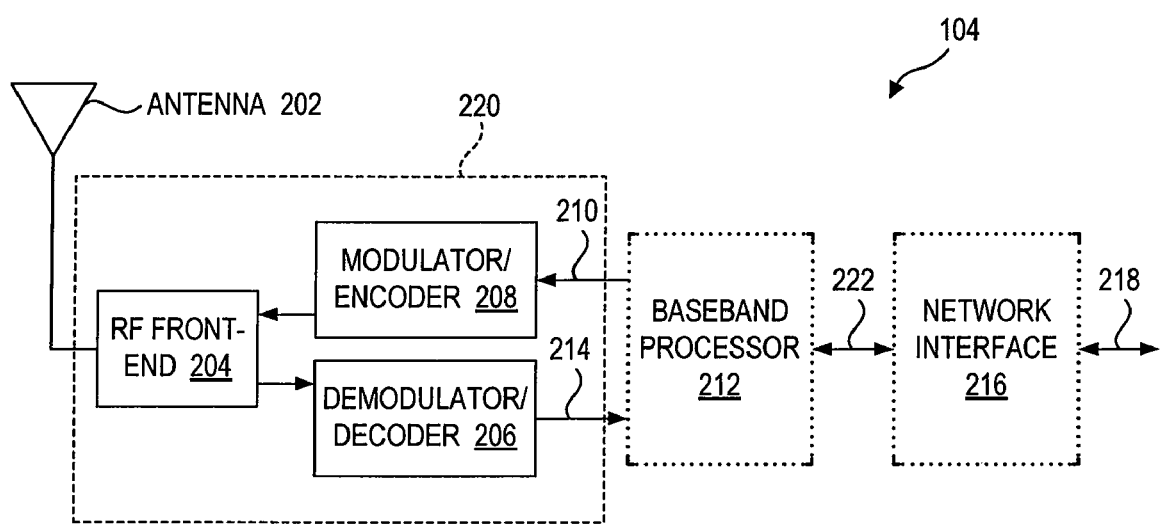
FIG. 2 is a block diagram of an example RFID reader.

FIG. 2 is a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions. If RFID reader 104 is battery powered, it will also contain a battery.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. Baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including for example and without limitation, a vertical, dipole, loop, Yagi-Uda, slot, and patch antenna type.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a Bluetooth link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as, for example, one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and downconverts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
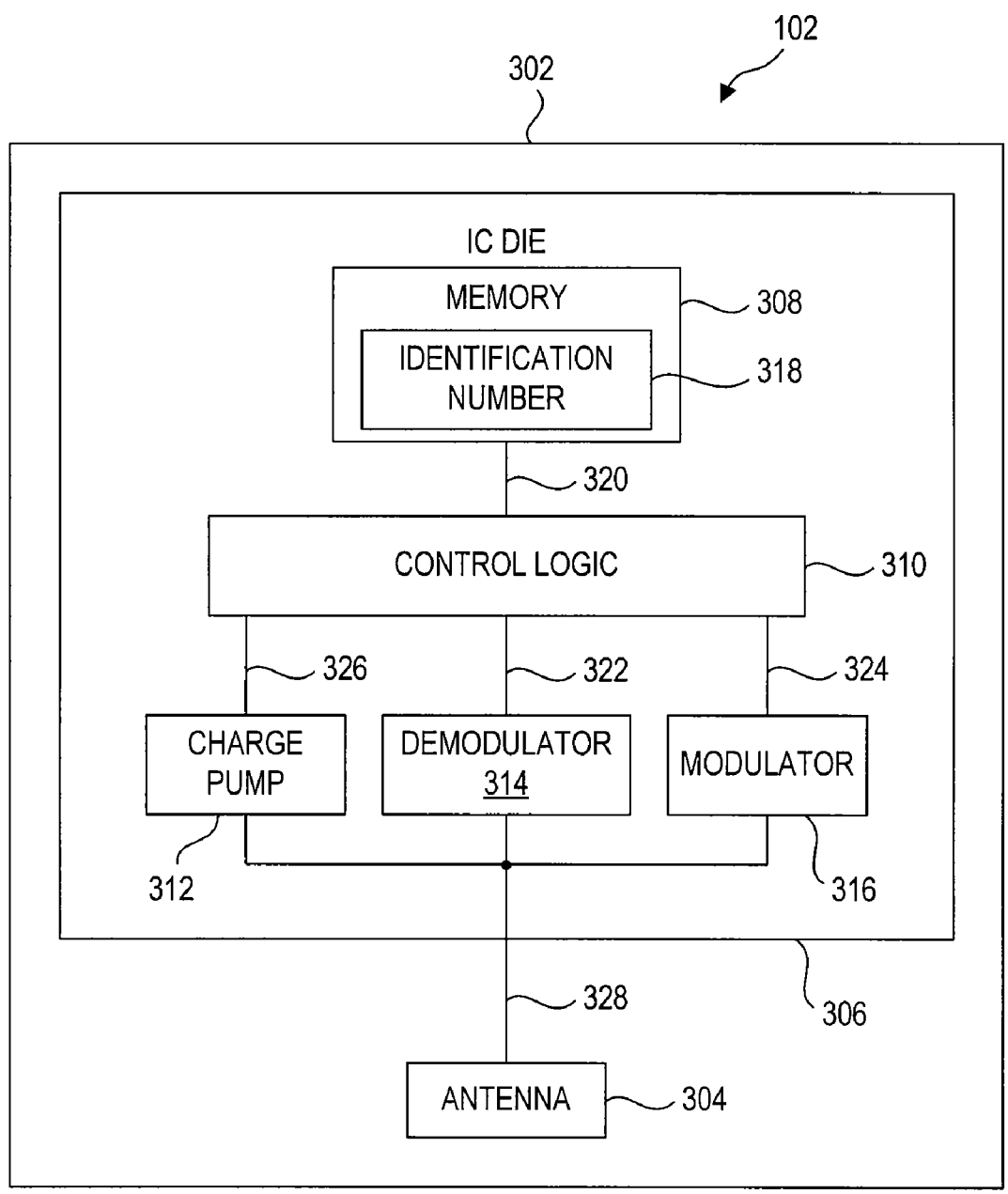
FIG. 3 is a schematic block diagram of an example radio frequency identification (RFID) tag.

The inventions described herein are applicable to any type of RFID tag and RFID reader system. FIG. 3 is a schematic block diagram of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including for example dipole, loop, slot, and patch. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. Inputs of charge pump 312, and demodulator 314, and an output of modulator 316 are coupled to antenna 304 by antenna signal 328.

Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on an input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112 (see FIG. 1), which is received by reader 104. In one example embodiment, modulator 316 includes a switch, such as a single pole, single throw (SPST) switch. The switch is configured in such a manner as to change the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 powers circuits of IC die 306, including control logic 320.

Charge pump 312 rectifies a portion of the power of the radio frequency communication signal of antenna signal 328 to create a voltage power. Charge pump 312 increases the voltage level of the rectified power to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Memory 308 is typically a non-volatile memory, but can alternatively be a volatile memory, such as a DRAM. Memory 308 stores data, including an identification number 318. In a Gen-2 tag, tag memory 308 may be logically separated into four memory banks.

Controlling Duty Cycle

Figure 4:
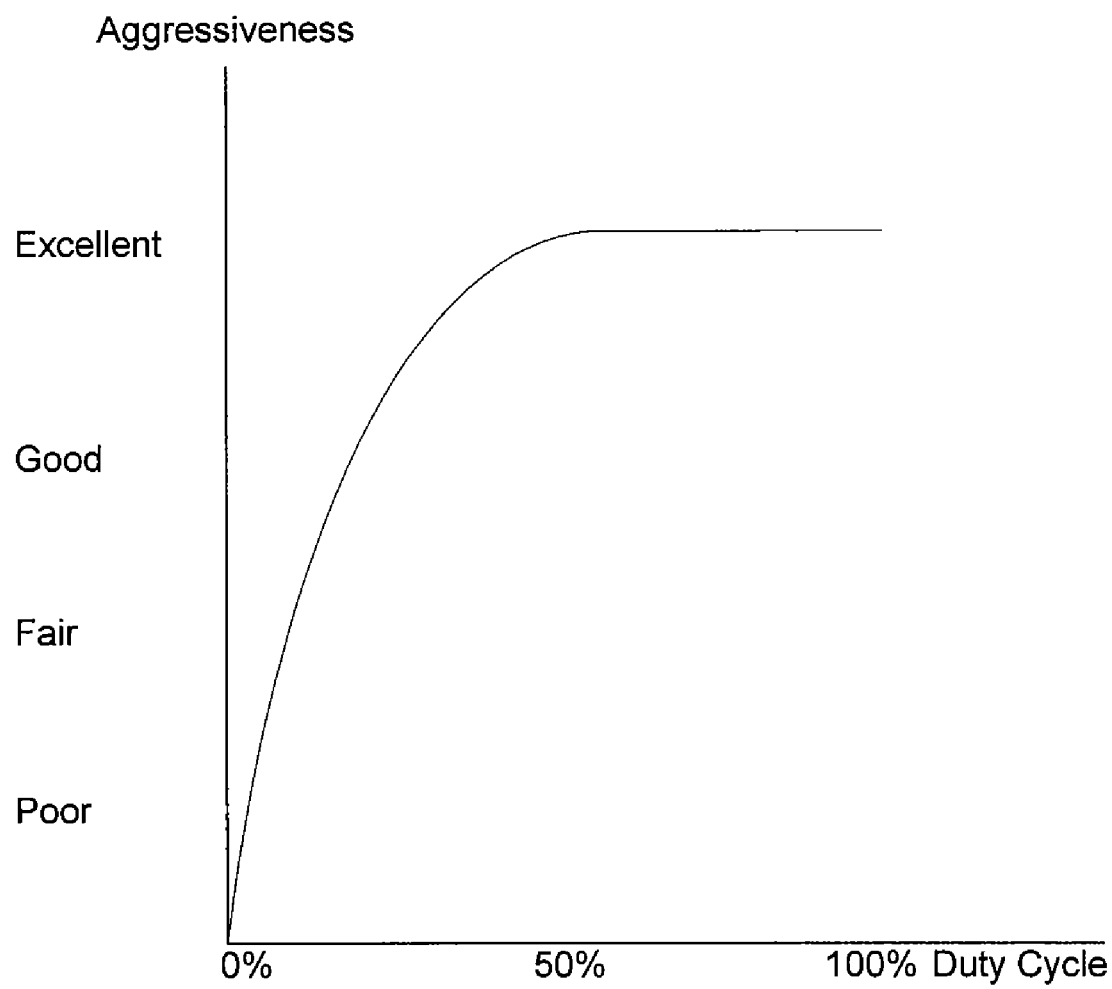
FIG. 4 is a graphical representation of duty cycle versus aggressiveness.

FIG. 4 is a graph explaining a basic concept of the inventions. It graphically depicts a relationship between read aggressiveness and duty cycle. A user of an RFID tag reader generally perceives that the reader is operating "well" when read attempts result in actual tag reads. If the duty cycle is high, the reader is sending out interrogation signals frequently and tags in the vicinity of the reader are more likely to respond and yield a successful read. If the duty cycle is low, read attempts occur less often and the reader is less likely to successfully read a tag. Such a reader will appear sluggish to the user. A reader operating with a high duty cycle will appear "aggressive" to the user. High aggressiveness, corresponding to high-duty cycle requires high power consumption. This is a problem for portable readers that are battery-operated. The inventions described herein control the duty cycle in a manner such that a reader operates aggressively during periods of time when its aggressiveness is likely to result in actual reads and operates less aggressively during periods of time when it is less likely to result in actual reads. Thus, battery life is conserved without a user perceiving that the aggressiveness of the reader has been significantly reduced. Under certain operational circumstances, the duty cycle is reduced or increased in a manner such that the average duty cycle is less than the maximum duty cycle.

Figure 5:
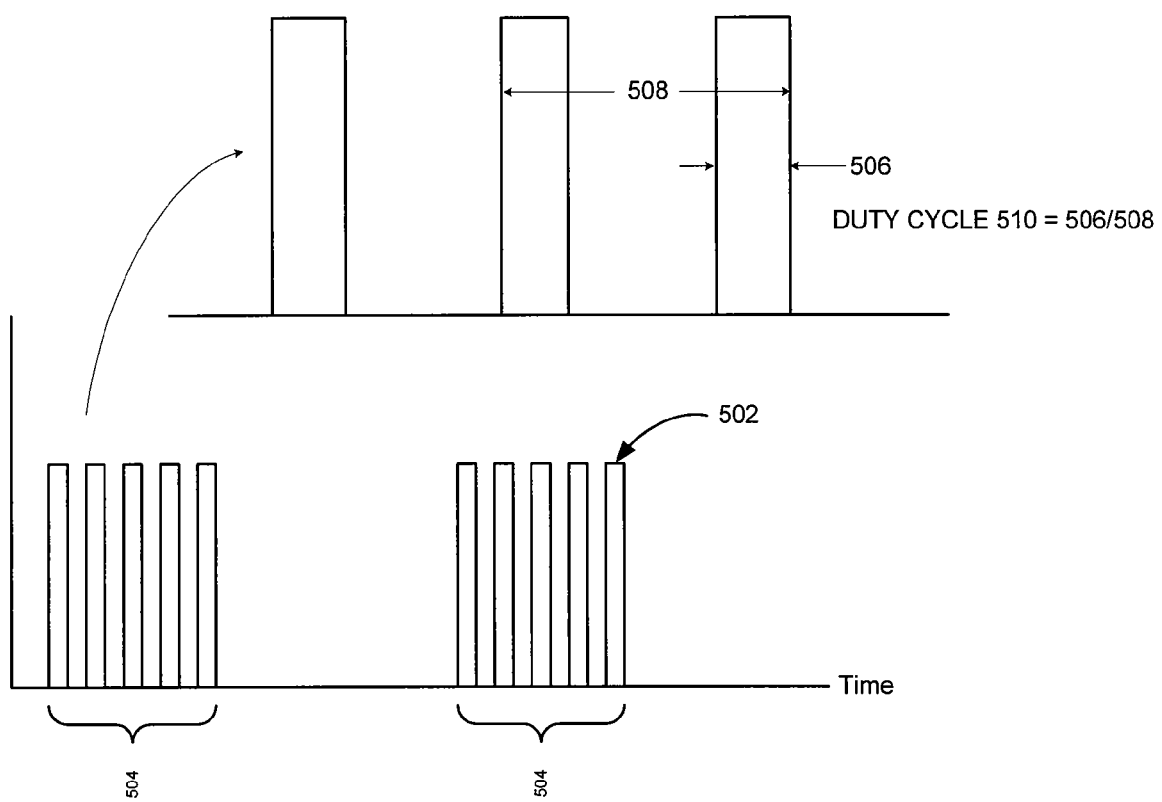
FIG. 5 is a graphical representation explaining some of the terms used to describe the inventions.

FIG. 5 and the following define some of the terms of art used in this patent document. A "single interrogation" 502 is the smallest transaction between a reader and a tag. An interrogation begins with a transmission from the reader. This transmission may or may not be answered by a tag. Typically, many single interrogations occur spaced over a fixed time interval. Power consumption is typically reduced between these transactions. A "read attempt period" 504 includes a plurality of single interrogations. The "duty cycle" 510 refers to the time interval 506 that it takes for a single interrogation divided by the time interval 508 from the start of a $1^{st}$ interrogation until the end of a second interrogation.

Readers operate in two distinct reader modes: 1) "trigger mode" and 2) "autonomous mode." In trigger mode operation, a read attempt period 504 is typically two to five seconds but may have some other duration. During a read attempt period 504 there are many single interrogations.

"Trigger mode" operation causes the RFID reader to attempt to read for some read attempt period 504 of time after a trigger takes place. During the read attempt period 504, there are many short single interrogations 502 spaced at some interval. There are many types of triggers that cause the onset of trigger mode operation. Typical triggers include but are not limited to: manual, sound activated, motion, gesture, and orientation.

Figure 6:
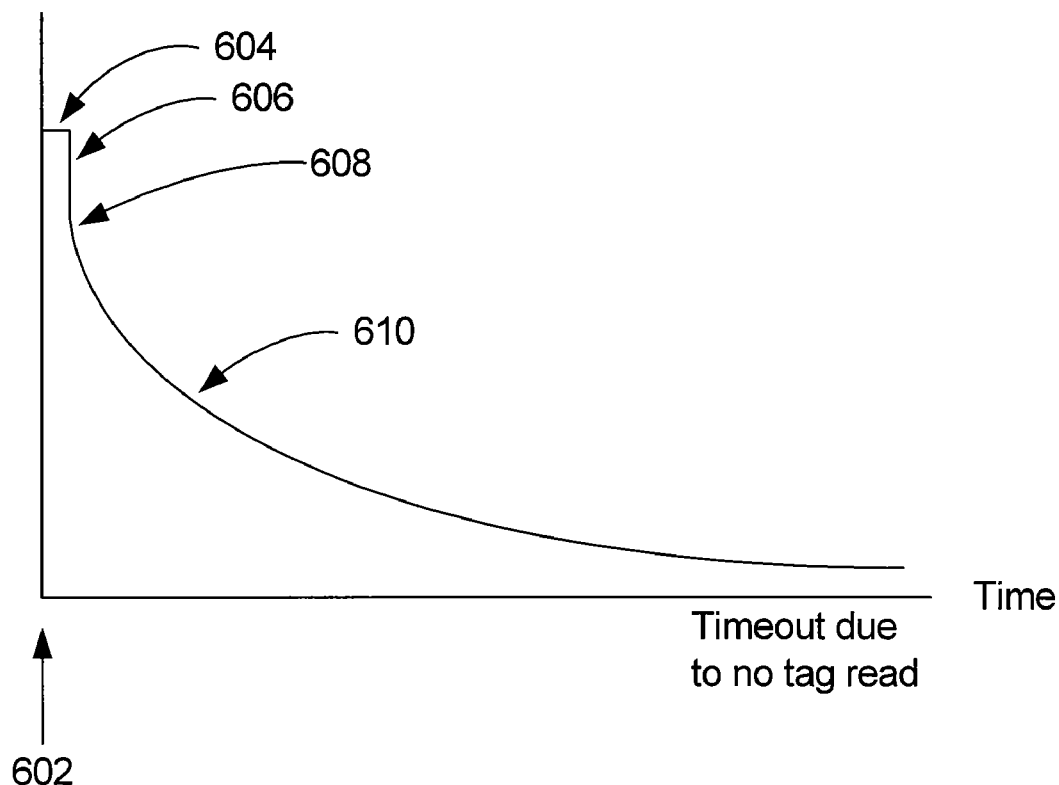
FIG. 6 is a graphical representation of the probability of a successful read following a trigger during trigger mode operation.

FIG. 6 is a graph representing a probability that power consumed during a read attempt period 504 will result in a successful read after a trigger event. The probability of a successful read decreases with the passage of time. The duty cycle begins at a predetermined maximum shown at time 602. According to one aspect of the inventions, the duty cycle 510 is incrementally reduced based on the amount of time elapsed since an RFID tag was actually read. During autonomous mode operation, there are many short read attempts spaced at some interval for as long as autonomous mode is active. No trigger is needed.

During autonomous and trigger mode operation, the duty cycle is reset to its high limit any time RFID tag activity is detected, regardless of whether a READ was successful or not. During trigger mode operation, the duty cycle is decreased from its high limit to its low limit during a read attempt period 504. The probability that power consumed during a read attempt period 504 will result in a successful read decreases with the passage of time during a read attempt period 504.

In FIG. 6, the horizontal axis represents time and the vertical axis represents a probability of a successful read. A trigger occurs at a time 602. Immediately after a trigger at 602, the probability of a successful read is its highest as represented by the portion of the graph at time 604. The highest probability exists due to the possibility a tag is in range when the trigger event occurs. After time 604, the probability of a successful read begins to fall as indicated by time 606. As time advances from time 608, the probability of a successful read continues to fall as indicated at time 610.

Figure 7:
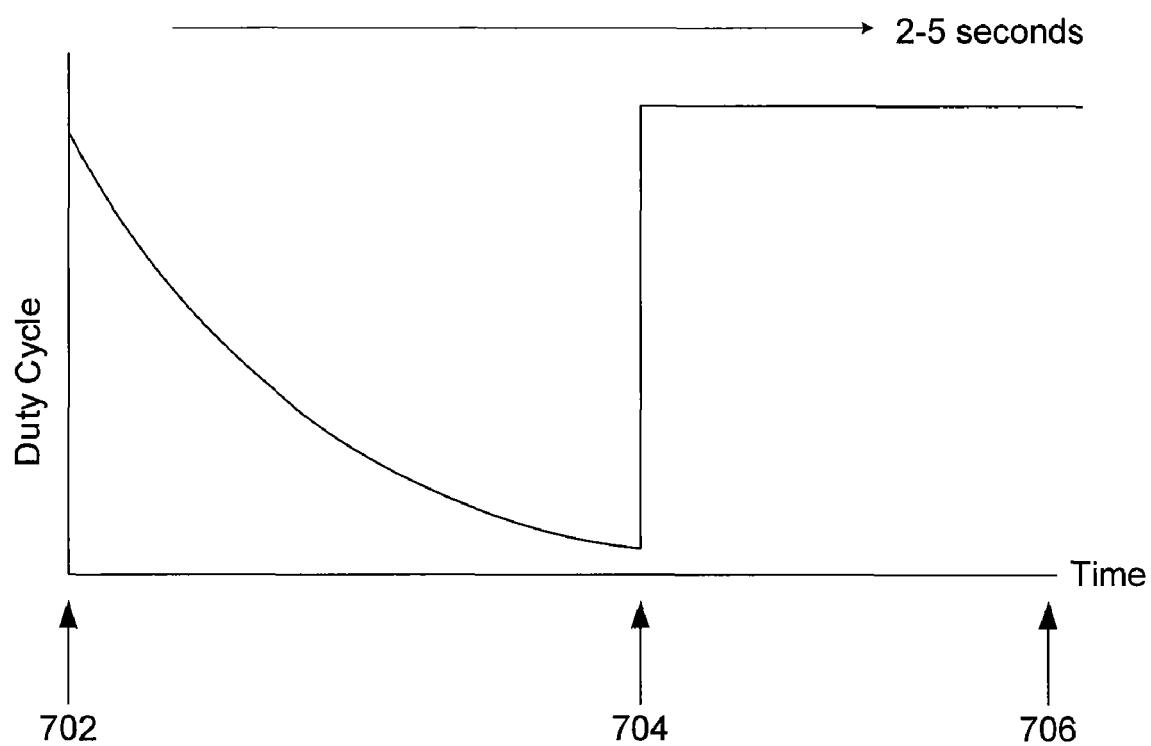
FIG. 7 is a graphical representation of duty cycle versus time during a read attempt (trigger mode operation).

FIG. 7 is a graphical representation of another concept of the inventions. The vertical access represents duty cycle. The horizontal axis indicates the passage of time, in this example, 2-5 seconds. During trigger mode operation, if an interrogation detects that there is a tag in range, but fails to successfully read the tag (e.g., if the tag is slightly out of range or noise is present), the duty cycle is set to the maximum limit for the remainder of the read attempt time. A trigger event occurs at a time 702. At time 704, a tag is found to be in range but a read attempt fails (e.g. due to noise). At time 704, the duty cycle is reset to its maximum limit because it is known that there is a tag in range. Reference numeral 706 indicates a point in time at which there is a timeout due to no tag having been read.

Figure 8:
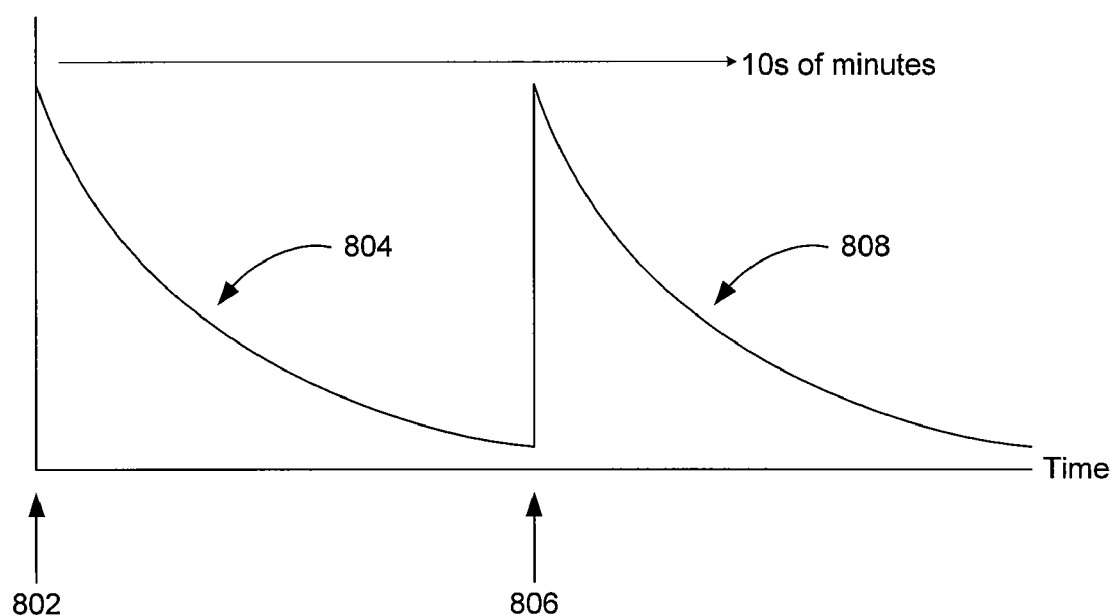
FIG. 8 is a graphical representation of autonomous mode operation indicating duty cycle after an RFID tag has been found to be in range.

FIG. 8 is a graphic representation of a concept of the algorithm relating to autonomous mode operation. The horizontal axis indicates the passage of time (in this example, tens of minutes) and the vertical axis indicates duty cycle. Initialization occurs at a time 802. Following time 802, duty cycle is reduced during a time indicated by 804. A tag is found to be in range at a time 806 which may or may not yield a successful read. Following time 806, the duty cycle again reduces during a time period indicated by 808. During autonomous mode operation, much of the time is spent when there are no tags in range. As the user is performing various tasks, there are time periods during which the probability of a tag being in range is low. The probability that a tag is in range for a fixed time period goes down with the passage of time. As an extreme example, consider the case where there has not been any activity in the last 30 minutes. It would be improbable that a tag would become in range in the subsequent one second period. Now consider the one second period that occurs a few seconds after a tag was known to be in range. It is more probable that a second tag would become in range during this period. It is therefore acceptable to reduce the aggressiveness of the reader by decreasing its duty cycle with the passage of time. This allows for a reduction in average power consumption. Thus, the systems and methods take advantage of the probability of a tag being in range. When the probability of a tag being in range is low, the duty cycle is reduced. The overall user perception, considering all read attempts that the user observes will not suffer significantly. Even a bad tag response due to noise, less than ideal tag orientation, or a response collision from two or more tags would reset the aggressiveness of the reader to its maximum limit. During trigger mode operation, the probability of a tag being in range is higher earlier in a read attempt period 504 because the read attempt period 504 terminates once a tag is read. A reader's duty cycle is maximized when there is a higher probability of a successful read and lowered when there is a lower probability of a successful read.

Figure 9:
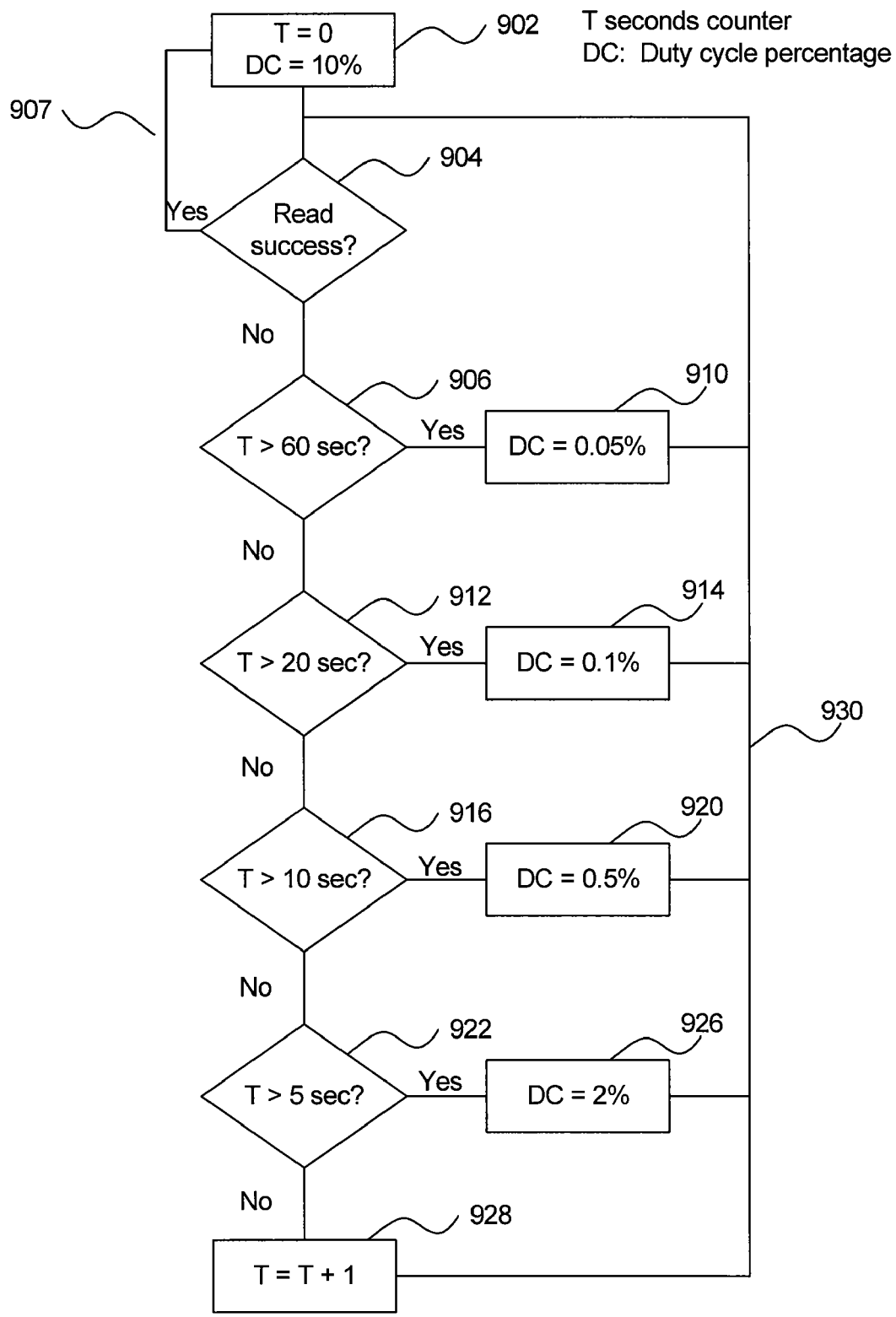
FIG. 9 is a flowchart indicating an example of an algorithm and method of operation according to the inventions.

FIG. 9 is a flowchart explaining an example of an algorithm for controlling duty cycle according to the inventions. This algorithm demonstrates operation during autonomous mode operation. It is one possible implementation of the concept explained in FIG. 8. Overall, carrying out the algorithm causes a reduction in duty cycle as time passes during autonomous mode operation. In this example, we assume a maximum duty cycle (DC) of 10% at time T=0 at step 902. At step 904, it is determined whether an RFID tag has been successfully read or a tag responded by did not yield a successful read. If a tag has been successfully read, control returns to 902 via path 907 and the duty cycle is not changed from 10%. However, if there has not been a successful read at step 904, control is passed to step 906. At step 906, it is determined whether a first time period (e.g. 60 seconds) has elapsed since a successful read. If the first time period has elapsed, the duty cycle DC is reduced (e.g. to 0.05%) at step 910. If the first time period has not lapsed, control passes to step 912. At step 912, it is determined whether a second time period (e.g. 20 seconds) has elapsed since a successful read. If the second time period has elapsed since a successful read, the duty cycle DC is re-set (e.g. to 0.1%) at step 914. If the second time period has not lapsed since a successful read, control passes to step 916. At step 916, it is determined whether a third time period (e.g. 10 seconds) has lapsed since a successful read. If so, the duty cycle DC is re-set (e.g. to 0.5%) at 920. If, on the other hand, at 916, it is determined that the third time period has not lapsed since a successful read, control passes to step 922. At step 922, it is determined whether a fourth time period (e.g. five seconds) has lapsed since a successful read. If so, the duty cycle DC is re-set (e.g. to 2%) at 926. If however, the fourth time period has not lapsed at step 922, a timer is incremented at step 928 and control passes to step 904 via path 930.

As would be appreciated by persons of skill in the art, fewer or additional time period decision points can be used in the exemplary methods. Additionally, the duty cycle values are intended to be exemplary. Other duty cycle values can be used.

CONCLUSION

The above examples a system and method for extending battery life by adjusting duty cycle of a battery-powered RFID tag reader during time periods when it is not likely to get a "read."

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for operating an RFID reader, comprising:
   first operating the RFID reader at a first duty cycle during a first period of time; and
   second operating the RFID reader at a second duty cycle less than the first duty cycle during a second period of time characterized by a probability of obtaining a read being less than the probability of obtaining a read during the first period of time; and
   wherein the second operating comprises operating the RFID reader at a decreasing duty cycle until a predetermined minimum duty cycle is reached.

2. An RFID reader, comprising:
   first means for operating the RFID reader at a first duty cycle during a first period of time; and
   second means for second operating the RFID reader at a second duty cycle less than the first duty cycle during a second period of time characterized by a probability of obtaining a read being less than the probability of obtaining a read during the first period of time and
   wherein the second operating means comprises means for operating the RFID reader at a decreasing duty cycle until a predetermined minimum duty cycle is reached.

3. A method for operating an RFID tag reader, comprising:
   first operating the RFID tag reader at a first duty cycle;
      in the event of a failure to detect RFID tag activity, reducing the duty cycle to a second duty cycle less than the first duty cycle; and
   in the event of continued failure to detect RFID tag activity, reducing the duty cycle to a third duty cycle less than the second duty cycle.

4. A method according to claim 1 wherein the first operating occurs following a trigger event.

5. A method according to claim 1 wherein the first operating comprising operating the RFID tag reader in an autonomous mode without any trigger.

6. A method according to claim 1 further comprising:
   operating the RFID tag reader at an increased duty cycle in response to a detection of some RFID tag activity.

7. A method according to claim 1 further comprising:
   stepping down the duty cycle at predetermined points in time related to an occurrence of an event.

8. A method according to claim 7 wherein the event is a detection of RFID tag activity.

9. A method according to claim 7 wherein the event is a successful RFID tag read.

* * * * *